United States Patent
Yamauchi et al.

(10) Patent No.: US 8,605,139 B2
(45) Date of Patent: *Dec. 10, 2013

(54) STEREOSCOPIC VIDEO DISPLAY APPARATUS AND DISPLAY METHOD

(75) Inventors: Himio Yamauchi, Yokohama (JP); Masatoshi Sano, Fukaya (JP); Ritsuo Yoshida, Tokyo (JP); Michihiro Fukushima, Tokyo (JP); Masahiro Yamada, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 256 days.

This patent is subject to a terminal disclaimer.

(21) Appl. No.: 13/046,327

(22) Filed: Mar. 11, 2011

(65) Prior Publication Data

US 2012/0033056 A1    Feb. 9, 2012

(30) Foreign Application Priority Data

Aug. 6, 2010  (JP) ................. 2010-177461

(51) Int. Cl.
*H04N 13/04* (2006.01)

(52) U.S. Cl.
USPC .......................................................... 348/51

(58) Field of Classification Search
USPC .......................................................... 348/51
See application file for complete search history.

(56) References Cited

U.S. PATENT DOCUMENTS

| | | | |
|---|---|---|---|
| 5,602,658 A | 2/1997 | Ezra et al. | |
| 6,064,424 A | 5/2000 | Van Berkel et al. | |
| 6,445,406 B1 | 9/2002 | Taniguchi et al. | |
| 7,113,231 B2 * | 9/2006 | Conner et al. | 349/5 |
| 7,522,161 B2 | 4/2009 | Katoka et al. | |
| 7,932,883 B2 | 4/2011 | Klompenhouwer et al. | |
| 8,130,272 B2 | 3/2012 | Pastoor et al. | |
| 8,154,587 B2 | 4/2012 | Fukushima et al. | |

(Continued)

FOREIGN PATENT DOCUMENTS

| | | |
|---|---|---|
| JP | 7005420 | 1/1995 |
| JP | 08331604 | 12/1996 |

(Continued)

OTHER PUBLICATIONS

Japanese Patent Application No. 2010-177461, Notification of Reasons for Rejection, mailed Aug. 2, 2011, (with English Translation).

(Continued)

*Primary Examiner* — David Czekaj
*Assistant Examiner* — Leron Beck
(74) *Attorney, Agent, or Firm* — Blakely, Sokoloff, Taylor & Zafman LLP

(57) ABSTRACT

In one embodiment, a stereoscopic video display apparatus includes: a plane display unit including a display screen in which first to third subpixels having respectively different color components are arranged in a matrix form; and an optical plate disposed to be opposed to the plane display unit and having a plurality of optical aperture parts. The plane display unit includes a configuration obtained by arranging the first subpixels on a first subpixel row, arranging the third subpixels on a second subpixel row adjacent to the first subpixel row, arranging the second subpixels on a third subpixel row adjacent to the second subpixel row, arranging the third subpixels on a fourth subpixel row adjacent to the third subpixel row, and arranging a set of the first to fourth subpixel rows in the column direction of subpixels on the display screen repeatedly.

9 Claims, 5 Drawing Sheets

(56) References Cited

U.S. PATENT DOCUMENTS

| | | | |
|---|---|---|---|
| 2004/0212633 A1 | 10/2004 | Natori et al. | |
| 2004/0234163 A1* | 11/2004 | Lee et al. | 382/298 |
| 2006/0012593 A1 | 1/2006 | Iriguchi et al. | |
| 2006/0012613 A1 | 1/2006 | Kataoka et al. | |
| 2006/0170606 A1 | 8/2006 | Yamagajo et al. | |
| 2006/0170616 A1 | 8/2006 | Hirayama et al. | |
| 2007/0046573 A1 | 3/2007 | Kim | |
| 2007/0257998 A1* | 11/2007 | Inoue | 348/272 |
| 2008/0043045 A1 | 2/2008 | Natori et al. | |
| 2008/0079662 A1 | 4/2008 | Saishu et al. | |
| 2009/0021534 A1* | 1/2009 | Tomizawa et al. | 345/690 |
| 2010/0026728 A1 | 2/2010 | Miyazaki et al. | |
| 2010/0118045 A1 | 5/2010 | Brown Elliott et al. | |
| 2011/0012893 A1 | 1/2011 | Iriguchi et al. | |
| 2012/0033054 A1 | 2/2012 | Yamauchi et al. | |
| 2012/0033055 A1 | 2/2012 | Yamauchi et al. | |
| 2012/0033058 A1 | 2/2012 | Yamauchi et al. | |
| 2012/0120213 A1 | 5/2012 | Ohyama et al. | |

FOREIGN PATENT DOCUMENTS

| | | |
|---|---|---|
| JP | 8335060 | 12/1996 |
| JP | 09236777 | 9/1997 |
| JP | 2003248461 | 9/2003 |
| JP | 2003295114 | 10/2003 |
| JP | 2004-040722 | 2/2004 |
| JP | 2008-083600 | 4/2004 |
| JP | 2004117431 | 4/2004 |
| JP | 2005017411 | 1/2005 |
| JP | 2005110022 | 4/2005 |
| JP | 2005-331603 | 12/2005 |
| JP | 2006-030512 | 2/2006 |
| JP | 2007065616 | 3/2007 |
| JP | 2004-117431 | 4/2008 |
| JP | 2008-092361 | 4/2008 |
| JP | 2010088087 | 4/2010 |

OTHER PUBLICATIONS

Japanese Patent Application No. 2010-177461, Notification of Reasons for Rejection, mailed May 13, 2011, (English Translation).

Japanese Patent Application No. 2010-177447, Notification of Reasons for Rejection, mailed May 27, 2011, (with English Translation).

Japanese Patent Application No. 2010-177423, Notification of Reasons for Rejection, mailed May 27, 2011, (with English Translation).

U.S. Appl. No. 13/051,844 Non-Final Office Action mailed May 28, 2013.

Japanese Patent Application No. 2010-177393, Notification of Reasons for Refusal, mailed May 27, 2011 (with English Translation).

* cited by examiner

| | | | | | | | | | | | |
|---|---|---|---|---|---|---|---|---|---|---|---|
| B | B | B | B | B | B | B | B | B | B | B | B |
| #1 | #2 | #3 | | | | | | | | | |
| G | G | G | G | G | G | G | G | G | G | G | G |
| #1 | #2 | #3 | | | | | | | | | |
| R | R | R | R | R | R | R | R | R | R | R | R |
| #1 | #2 | #3 | | | | | | | | | |
| B | B | B | B | B | B | B | B | B | B | B | B |
| #1 | #2 | #3 | | | | | | | | | |
| G | G | G | G | G | G | G | G | G | G | G | G |
| #1 | #2 | #3 | | | | | | | | | |
| R | R | R | R | R | R | R | R | R | R | R | R |
| #1 | #2 | #3 | | | | | | | | | |
| B | B | B | B | B | B | B | B | B | B | B | B |
| #1 | #2 | #3 | | | | | | | | | |
| G | G | G | G | G | G | G | G | G | G | G | G |
| #1 | #2 | #3 | | | | | | | | | |
| R | R | R | R | R | R | R | R | R | R | R | R |
| #1 | #2 | #3 | | | | | | | | | |

Rows labeled $p_{1,1}$, $p_{2,1}$, $p_{3,1}$ at top.

FIG. 5

STEREOSCOPIC VIDEO DISPLAY APPARATUS AND DISPLAY METHOD

CROSS-REFERENCE TO RELATED APPLICATION

This application is based upon and claims the benefit of priority from prior Japanese Patent Application No. 2010-177461 filed on Aug. 6, 2010 in Japan, the entire contents of which are incorporated herein by reference.

FIELD

Embodiments described herein relate generally to a stereoscopic video display apparatus and a display method.

BACKGROUND

As to the stereoscopic video display apparatus, which is the so-called three-dimensional display, various schemes are known. In recent years, demands for a scheme which is for a flat panel type and which does not need dedicated glasses have increased. In stereoscopic moving picture display apparatuses of this type, there are also apparatuses which utilize the principle of the holography. However, it is difficult to put them to practical use. A scheme in which an optical plate is installed immediately before a display panel (plane display device) having fixed pixel positions, such as a direct view type or projection type liquid crystal display device or plasma display device, to control light rays supplied from the display panel and direct the light rays to a viewer is known as a scheme which can be implemented with comparative ease.

The optical plate is typically called parallax barrier as well. The optical plate controls light rays to make different images visible from different angles even in the same position on the optical plate. Specifically, in the case where only lateral disparity (horizontal disparity) is given, a slit or lenticular sheet (cylindrical lens array) is used. In the case where up-and-down disparity (vertical disparity) is also included, a pinhole array or a lens array is used. The schemes using the parallax barrier are further classified into the binocular scheme, multiview scheme, super-multiview scheme (super-multiview condition of the multiview scheme), and integral photography (hereafter referred to as IP as well). The basic principle of them is substantially the same as the principle which has been used in stereoscopic photograph invented approximately 100 years ago.

Among them, the IP scheme has a feature that the degree of freedom of the viewpoint position is high and the stereoscopic view can be obtained easily. In the IP scheme in which there is only horizontal disparity and there isn't vertical disparity, it is also possible to implement a display device having high resolution with comparative ease. On the other hand, in the binocular scheme and multiview scheme, there is a problem that the range of the viewpoint position which allows stereoscopic view, i.e., the viewing zone is narrow and it is hard to view. However, the configuration of the stereoscopic video display apparatus is the simplest, and the display image can be generated simply.

In such a direct view type autostereoscopic video display apparatus using a slit or lenticular sheet, moiré or color moiré is apt to be generated by interference between a periodic structure of optical apertures of the optical plate and a periodic structure of pixels of the plane display device. As its countermeasure, a method of using lateral stripe arrangement as the color arrangement of pixels is known.

If the lateral stripe arrangement is used as the color arrangement of pixels, however, there is a problem in the conventional stereoscopic video display apparatus that the number of subpixels forming RGB to display an elemental image which is a set of parallax images assigned to the same optical aperture part does not decrease and the resolution does not increase.

BRIEF DESCRIPTION OF THE DRAWINGS

FIG. 5 is a diagram for explaining display of a parallax image in a stereoscopic video display apparatus according to a comparative example.

DETAILED DESCRIPTION

Figure 1:
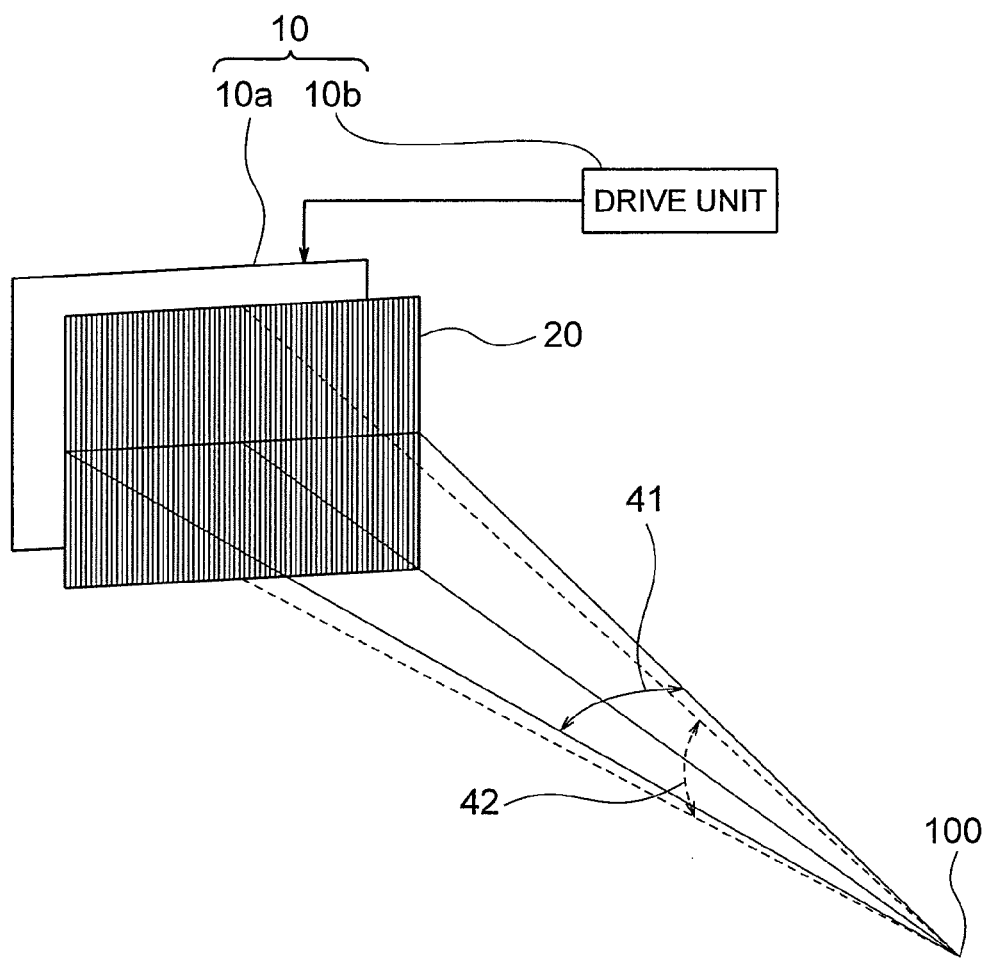
FIG. 1 is a diagram showing a configuration of a stereoscopic video display apparatus according to an embodiment.

In one embodiment, a stereoscopic video display apparatus includes: a plane display unit configured to include a display screen in which first to third subpixels having respectively different color components are arranged in a matrix form; and an optical plate configured to be disposed to be opposed to the plane display unit, the optical plate having a plurality of optical aperture parts, a direction of extension of the optical aperture parts being substantially parallel to a column direction of subpixels on the display screen, light rays from the plane display unit being controlled by the optical plate. The plane display unit includes a configuration obtained by arranging the first subpixels on a first subpixel row, arranging the third subpixels on a second subpixel row adjacent to the first subpixel row, arranging the second subpixels on a third subpixel row adjacent to the second subpixel row, arranging the third subpixels on a fourth subpixel row adjacent to the third subpixel row, and arranging a set of the first to fourth subpixel rows in the column direction of subpixels on the display screen repeatedly.

Hereafter, an embodiment will be described more specifically with reference to the drawings. Throughout the drawings, components having the same or similar functions are denoted by like reference numerals, and description for such components will not be repeated.

A stereoscopic video display apparatus according to an embodiment of the present invention will be described with reference to the drawings. FIG. 1 shows a typical configuration of the stereoscopic video display apparatus. The stereoscopic video display apparatus shown in FIG. 1 includes a plane display device 10 and an optical plate 20. The plane display device 10 includes a plane display unit (referred to as display panel as well) 10a having a display screen formed of pixels arranged in a matrix form, and a drive unit 10b which drives the plane display unit 10a. The optical plate 20 is provided in front of the plane display unit 10a, and the optical plate 20 includes optical aperture parts to control light rays supplied from the pixels in the plane display unit 10a. It becomes possible to view a stereoscopic image in front of and behind the optical plate 20 by viewing light rays, which are emitted from the plane display unit 10a via the optical plate 20, from a position 100 of eyes of the viewer, in a range of a viewing angle 41 in the horizontal direction and a viewing angle of 42 in the vertical direction. By the way, the optical aperture part is a physical aperture part in the case where the optical plate is a slit, whereas the optical aperture part is each cylindrical lens in the case where the optical plate is a lenticular sheet. In these cases, there is parallax only in a horizontal direction 41 and an image changes according to the viewing distance. Since there is no parallax in a vertical direction 42, however, a constant video is perceived regardless of the viewing position. In some cases, a spacer is provided between the plane display unit 10a and the optical plate 20 to adjust the focal length.

As long as pixels having determined positions in the display screen are arranged in a planar matrix form, the plane display unit 10a may be a display panel such as a liquid crystal display device of direct view type or projection type, a plasma display device, an electric field emission type display device, or an organic EL display device. The drive unit 10b sends display data to the plane display unit 10a, assigns the display data to the pixels in the plane display unit 10a, and drives the stereoscopic video display apparatus to display a stereoscopic video. The drive unit 10b may be integral with the plane display unit 10a, or may be provided outside of the plane display unit 10a.

Figure 2:
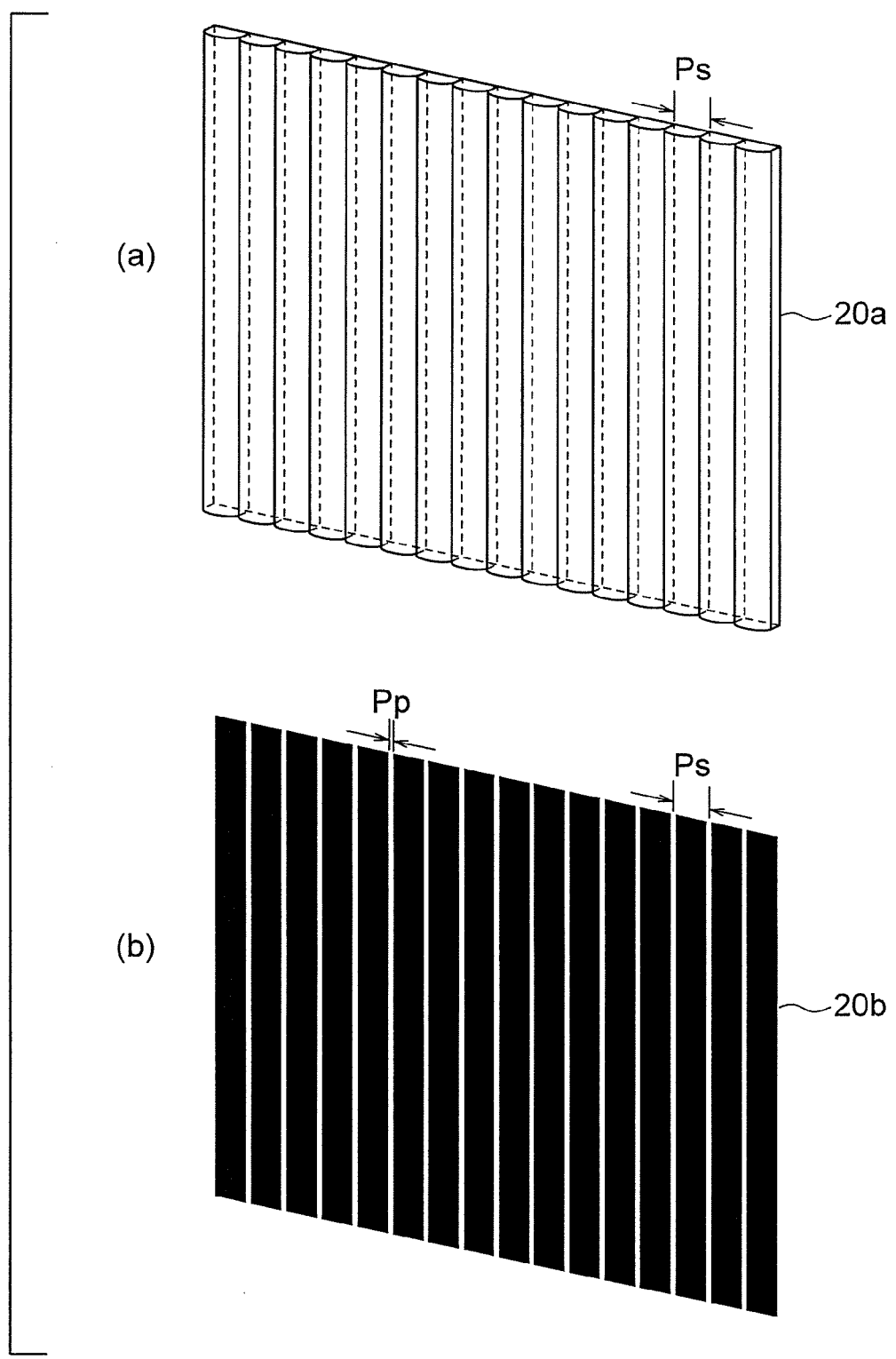
FIGS. 2(a) and 2(b) are diagrams showing an optical plate used in a stereoscopic video display apparatus according to an embodiment.

Furthermore, in the configuration of the stereoscopic video display apparatus according to the present embodiment, the extension direction of the optical aperture parts of the optical plate 20 is made parallel to the longitudinal direction (vertical direction) of the display screen in the plane display unit 10a. For example, an oblique view in the case where the optical plate 20 is a lenticular sheet 20a formed of a plurality of cylindrical lenses 21 is shown in FIG. 2(a), and an oblique view in the case where the optical plate 20 is a slit 20b is shown in FIG. 2(b). In FIGS. 2(a) and 2(b), Ps denotes a pitch of the optical aperture parts in the optical plate 20. In FIG. 2(b), Pp denotes a size of an aperture part in the slit.

In the stereoscopic video display apparatus according to the present embodiment, the display screen of the plane display unit 10a has R (red), G (green) and B (blue) subpixels arranged in an array form. By the way, the R (red), G (green) and B (blue) subpixels are implemented by suitably arranging color filters on the display screen. In the present embodiment, the direction of extension of the optical aperture parts in the optical plate 20 is parallel to the longitudinal direction (vertical direction) of the display screen in the plane display unit 10a, and consequently the direction is parallel to the column direction of subpixels. In the present embodiment, each subpixel includes an aperture part and a black matrix. Therefore, the subpixels are arranged in the longitudinal direction and the lateral direction to be adjacent to each other. Each subpixel has a longitudinal to lateral size ratio of 3:1. In other words, denoting a pitch of subpixels in the lateral direction (horizontal direction) by $p_h$ and denoting a pitch of subpixels in the longitudinal direction (vertical direction) by $p_v$, the relation $p_h/p_v=1/3$ is satisfied (see FIG. 3).

Figure 3:
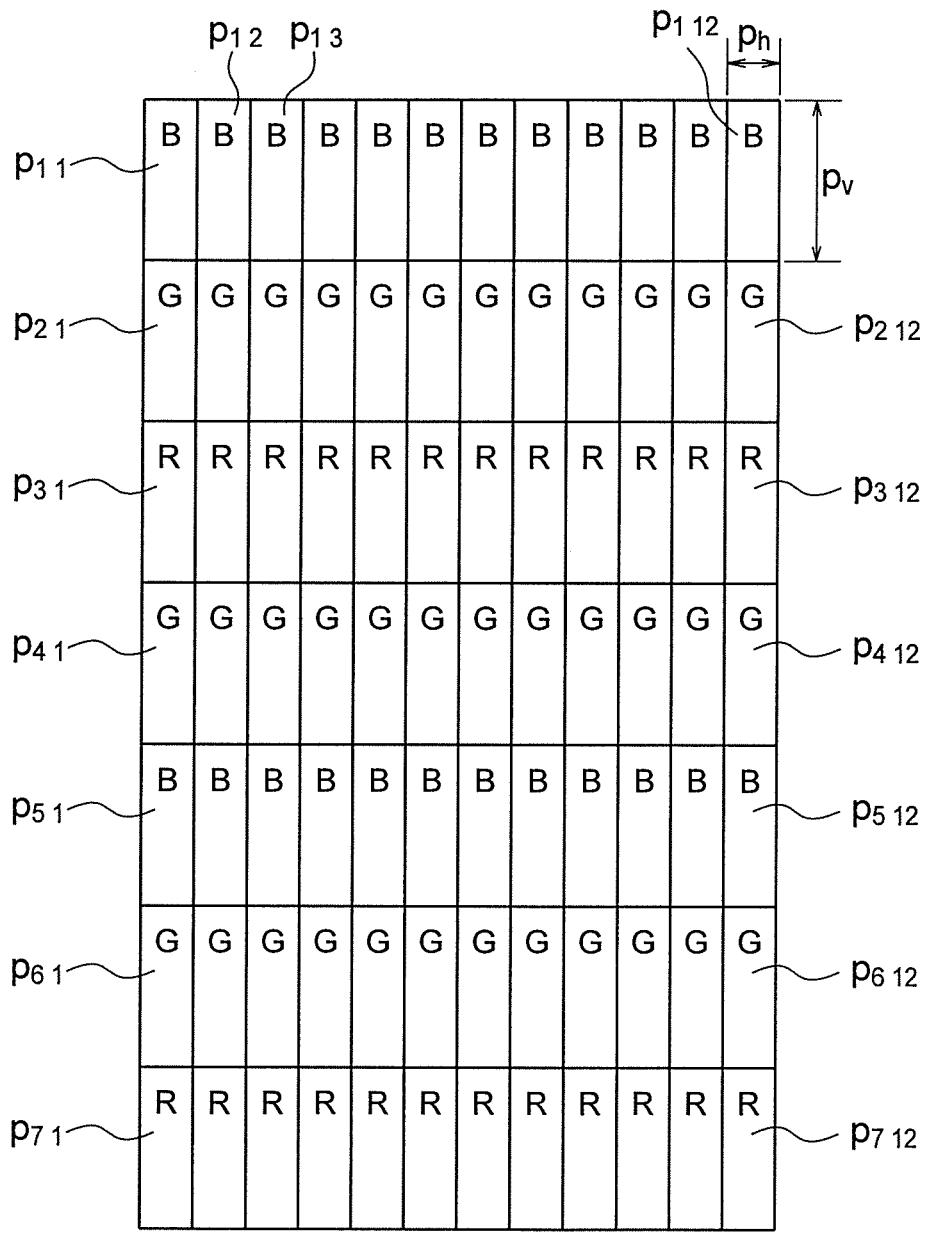
FIG. 3 is a diagram showing an arrangement of R, G and B subpixels in a stereoscopic video display apparatus according to an embodiment.

Arrangement of the R, G and B subpixels in the present embodiment is shown in FIG. 3. As shown in FIG. 3, B subpixels are arranged in a first subpixel row. G subpixels are arranged in a second subpixel row. R subpixels are arranged in a third subpixel row. G subpixels are arranged in a fourth subpixel row. B subpixels are arranged in a fifth subpixel row. G subpixels are arranged in a sixth subpixel row. R subpixels are arranged in a seventh subpixel row. In other words, a set of the first to the fourth subpixel rows is arranged in the vertical direction of the display screen (the column direction of subpixels) repeatedly. Incidentally, a configuration in which only B subpixels are arranged in the first subpixel row, only G subpixels are arranged in the second subpixel row, only R subpixels are arranged in the third subpixel row, only G subpixels are arranged in the fourth subpixel row, only B subpixels are arranged in the fifth subpixel row, only G subpixels are arranged in the sixth subpixel row, and only R subpixels are arranged in the seventh subpixel row is desirable.

The present embodiment has a configuration in which a subpixel row formed of B subpixels, a subpixel row formed of G subpixels, and a subpixel row formed of R subpixels are provided next to a final set in the cited order. Furthermore, a configuration in which a subpixel row formed of only B subpixels, a subpixel row formed of only G subpixels, and a subpixel row formed of only R subpixels are provided next to the final set in the cited order is desirable.

For example, as shown in FIG. 3, the arrangement of subpixels is represented by $p_{i,j}$ (i=1, ..., 7, j=1, ..., 12). In other words, $p_{i,j}$ (i=1, ..., 7, j=1, ..., 12) represents a subpixel in an i-th subpixel row and a j-th subpixel column. In the present embodiment, a subpixel $p_{1,k}$ (k=1, ..., 12) in a first subpixel row is a B subpixel. A subpixel $p_{2,j}$ (j=1, ..., 12) in a second subpixel row and a subpixel $p_{4,j}$ (j=1, ..., 12) in a fourth subpixel row are G subpixels. A subpixel $p_{3,k}$ (k=1, ..., 12) in a third subpixel row is an R subpixel. A set of the first to fourth subpixel rows is arranged in the vertical direction of the display screen repeatedly. Incidentally, only one set of the first to fourth subpixel rows is shown in FIG. 3. The present embodiment has a configuration in which a subpixel row formed of B subpixels, a subpixel row formed of G subpixels, and a subpixel row formed of R subpixels are provided next to the final set in the cited order.

In general, in the stereoscopic video display apparatus, an elemental image which is a set of parallax images assigned to the same aperture part of the optical plate includes numbered parallax images. In the present embodiment, therefore, one parallax image is assigned to each subpixel row. This assignment of the parallax images will be described with reference to FIG. 4. This assignment is performed by the drive unit 10b.

Figure 4:
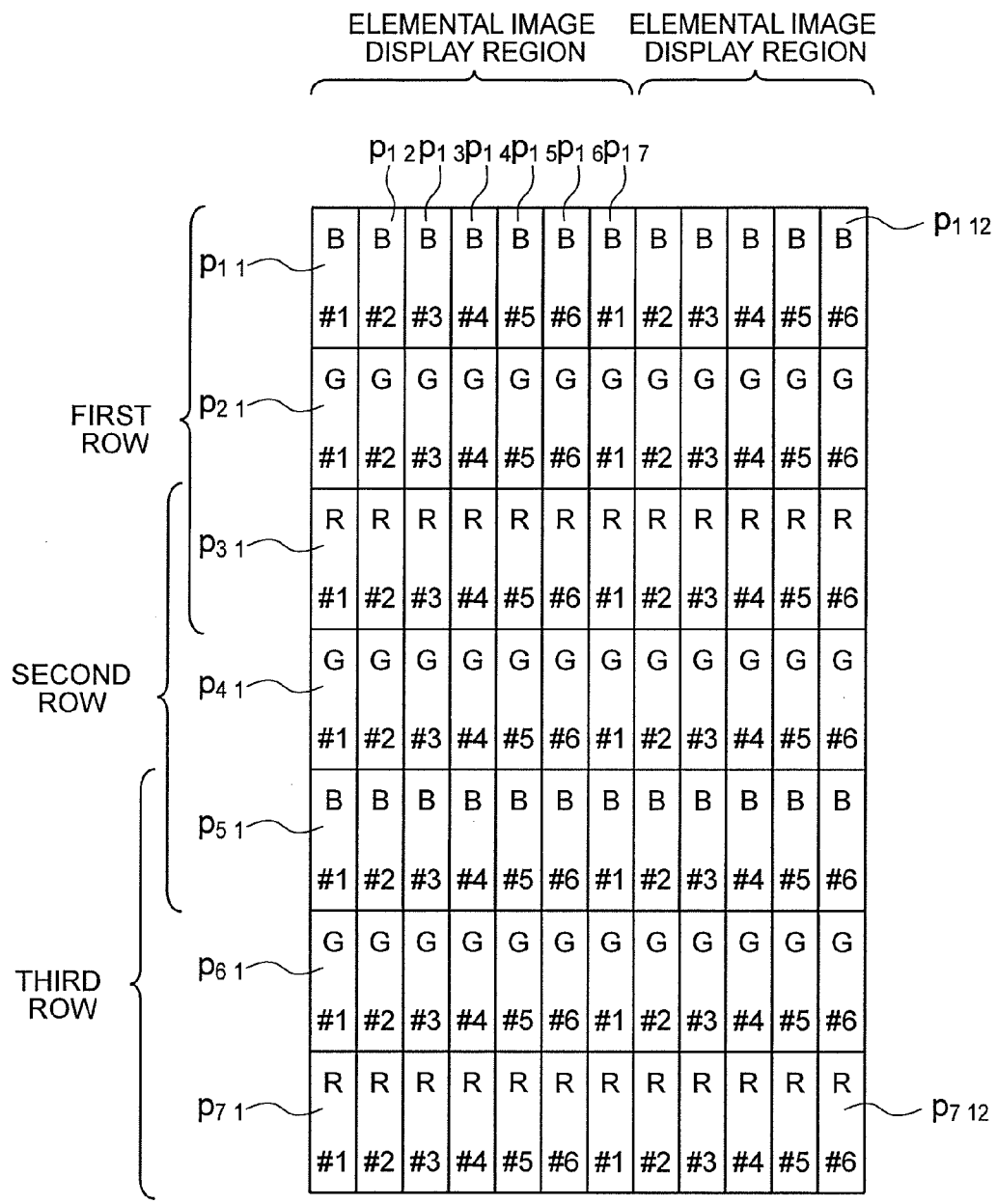
FIG. 4 is a diagram for explaining display of a parallax image in a stereoscopic video display apparatus according to an embodiment.

In each frame, a first parallax image (denoted by #1) of one elemental image (for example, a first elemental image) is displayed by using subpixels $p_{1,1}, p_{2,1}, p_{3,1}, p_{4,1}, p_{5,1}, p_{6,1}$ and $p_{7,1}$ as shown in FIG. 4. A second parallax image (denoted by #2) is displayed by using subpixels $p_{1,2}, p_{2,2}, p_{3,2}, p_{4,2}, p_{5,2}, p_{6,2}$ and $p_{7,2}$. A third parallax image (denoted by #3) is displayed by using subpixels $p_{1,3}, p_{2,3}, p_{3,3}, p_{4,3}, p_{5,3}, p_{6,3}$ and $p_{7,3}$. A fourth parallax image (denoted by #4) is displayed by using subpixels $p_{1,4}, p_{2,4}, p_{3,4}, p_{4,4}, p_{5,4}, p_{6,4}$ and $p_{7,4}$. A fifth parallax image (denoted by #5) is displayed by using subpixels $p_{1,5}, p_{2,5}, p_{3,5}, p_{4,5}, p_{5,5}, p_{6,5}$ and $p_{7,5}$. A sixth parallax image (denoted by #6) is displayed by using subpixels $p_{1,6}, p_{2,6}, p_{3,6}, p_{4,6}, p_{5,6}, p_{6,6}$ and $p_{7,6}$.

Incidentally, the subpixels $p_{1,7}, p_{2,7}, p_{3,7}, p_{4,7}, p_{5,7}, p_{6,7}$ and $p_{7,7}$ display a first parallax image of a second elemental image corresponding to an optical aperture part which is adjacent in a rightward direction to an optical aperture part of the optical plate 20 corresponding to the first elemental image. A set of subpixels displaying one elemental image is referred to as elemental image display region. In other words, the elemental image display region includes subpixels which display odd-numbered parallax images and subpixels which display even-numbered parallax images.

In FIG. 4, a set of subpixels $p_{1,1}, p_{2,1}$ and $p_{3,1}$ displaying a first parallax image in the first elemental image represents one pixel (for example, a first pixel) formed of B, G and R subpixels. A set of subpixels $p_{3,1}, p_{4,1}$ and $p_{5,1}$ displaying the first parallax image represents one pixel (for example, a second pixel) formed of B, G and R subpixels which is adjacent to the first pixel in the vertical downward direction when displaying the same parallax image. A set of subpixels $p_{5\ 1}$, $p_{6\ 1}$ and $p_{7\ 1}$ displaying the first parallax image represents one pixel (for example, a third pixel) formed of B, G and R subpixels which is adjacent to the second pixel in the vertical downward direction when displaying the same parallax image. In other words, the first pixel and the second pixel become pixels which are adjacent to each other in the vertical direction when displaying the first parallax image, and the second pixel and the third pixel become pixels which are adjacent to each other in the vertical direction when displaying the first parallax image. Therefore, pixels which are adjacent in the vertical direction are assigned to share R subpixels or B subpixels by the drive unit $10b$. This is also true of the case where other parallax images are displayed in each frame.

In this way, the drive unit $10b$ performs assignment in each frame to cause pixels in each parallax image which are adjacent in the vertical direction to each other to share an R subpixel or a B subpixel as shown in FIG. 4. In other words, an odd-numbered pixel (for example, the first pixel or the third pixel) which displays each parallax image is formed of a G subpixel, a B subpixel which is located above the G subpixel and adjacent to the G subpixel, and an R subpixel which is located below the G subpixel and adjacent to the G subpixel. An even-numbered pixel (for example, the second pixel) which displays each parallax image is formed of three subpixels including pixels which are located respectively above and below a G subpixel and adjacent to the G subpixel. The subpixel which is located above the G subpixel and adjacent to the G subpixel is an R subpixel, and the subpixel which is located below the G subpixel and adjacent to the G subpixel is a B subpixel. In either case, there is a G subpixel in the center of a pixel which displays each parallax image.

Each elemental image has a configuration in which each pixel which displays an odd-numbered parallax image (for example, a pixel formed of subpixels $p_{1\ 1}$, $p_{2\ 1}$ and $p_{3\ 1}$ which displays the first parallax image) and each pixel which displays a parallax image having an even number adjacent to the odd number (for example, a pixel formed of subpixels $p_{1\ 2}$, $p_{2\ 2}$ and $p_{3\ 2}$ which displays the second parallax image) are arranged to be adjacent to each other in the horizontal direction.

In addition, in each elemental image, a pixel located at the top in the vertical direction as an odd-numbered parallax image (for example, a pixel formed of subpixels $p_{1\ 1}$, $p_{2\ 1}$ and $p_{3\ 1}$) is disposed in first to third subpixel rows of the odd-numbered subpixel column in the elemental image display region and a pixel located at the top in the vertical direction as an even-numbered parallax image (for example, a pixel formed of subpixels $p_{1\ 2}$, $P_{2\ 2}$ and $p_{3\ 2}$) is disposed in the first to third subpixel rows of the even-numbered subpixel column in the elemental image display region. Such assignment of parallax images to the elemental image display regions is performed as a result of driving of the plane display unit $10a$ performed by the drive unit $10b$.

In FIG. 4, first to third subpixel rows constitute a first row of each frame, third to fifth subpixel rows constitute a second row of each frame, and fifth to seventh subpixel rows constitute a third row of each frame. In other words, each row in each frame is formed of three subpixel rows, and adjacent rows share one subpixel row. The shared subpixel row is formed of only R subpixels or formed of only B subpixels.

In the present embodiment, signal values of subpixels in one subpixel row shared by two adjacent rows in each frame at the time when displaying each parallax image are determined as described hereafter. A signal value (for example, intensity of a luminance signal) of each subpixel in the subpixel row shared by the two adjacent rows is generated by using a signal value (for example, a first signal value) of a color displayed by the subpixel in a pixel including the subpixel which displays the parallax image in one of the two rows sharing the subpixel and a signal value (for example, a second signal value) of the color displayed by the subpixel in a pixel including the subpixel which displays the same parallax image in the other of the two rows sharing the subpixel. The generated value may be, for example, an arithmetic average value of those signal values, i.e., the first and second signal values, or a weighted average value of them. For example, the case where the subpixel row shared by the first row and the second row in the frame shown in FIG. 4 is a subpixel row formed of only R subpixels will now be described. A signal value of the subpixel $p_{3\ 1}$ in the shared subpixel row is generated by using a signal value of red (R) of a pixel (the first pixel) formed of the subpixels $p_{1\ 1}$, $p_{2\ 1}$ and $p_{3\ 1}$ sharing the subpixel $p_{3\ 1}$ and a signal value of red (R) of a pixel (the second pixel) formed of the subpixels $p_{3\ 1}$, $p_{4\ 1}$ and $p_{5\ 1}$ sharing the subpixel $p_{3\ 1}$.

In the description, the signal value of each subpixel in the subpixel row shared by two adjacent rows is generated based on the signal values of, the color displayed by the subpixel, of the pixels respectively included in these two adjacent rows. Alternatively, however, the signal value may be generated based on signal values of, the color represented by the shared subpixel, of four pixels which display the parallax image in four rows formed of the two adjacent rows, a row located close above the two adjacent rows and a row located close below the two adjacent rows.

The signal value may be generated based on signal values of, the color represented by the shared subpixel, of a plurality of pixels which display the parallax image in the two adjacent rows, a plurality of rows located above the two adjacent rows and a plurality of rows located below the two adjacent rows.

In the present embodiment having such a configuration, the number of subpixels displaying the same parallax image is 2N+1, where N is the number of rows in each subframe. This is because adjacent rows in each subframe share one subpixel row and each row has one subpixel row which displays G (green).

On the other hand, FIG. 5 shows a comparative example in which R, G and B subpixels are arranged in a lateral stripe form. A stereoscopic video display apparatus according to the comparative example has a configuration in which a set of a B subpixel row, a G subpixel row and an R subpixel row is arranged in the vertical direction of the display screen (the column direction of subpixels) repeatedly. In a stereoscopic video display apparatus according to the comparative example as well, the direction of extension of optical apertures of the optical plate is parallel to the longitudinal direction of the display screen in the plane display unit in the same way as the present embodiment. In this comparative example, the number of subpixels which display the same parallax image becomes 3N, where the number of rows in each frame is N. This is because in the case of the lateral stripe arrangement shown in FIG. 5 the same parallax image is displayed by the same subpixel column, R, G and B subpixels (for example, $p_{1\ 1}$, $p_{2\ 1}$ and $p_{3\ 1}$) which are consecutive in the same subpixel column constitute one pixel, and each row in each frame corresponds to three subpixel rows. Incidentally, the comparative example in which R, G and B subpixels are arranged in the lateral stripe form is used in the conventional stereoscopic video display apparatus.

When displaying the same parallax image, it becomes possible according to the present embodiment to display it with subpixels which is less in number as compared with the comparative example as understood from the foregoing description. This means that a larger number of parallax images can be displayed with a smaller number of subpixels. As a result, the resolution can be increased.

Furthermore, in the present embodiment, the number of G subpixels is approximately twice each of the number of R subpixels and the number of B subpixels. Therefore, it is desirable to cause the intensity of light emitted from each G subpixel to become equal to substantially half of the intensity of light emitted from each R subpixel or each B subpixel. Hereafter, this is referred to as halving. The halving can be implemented by using, for example, a method described hereafter.

Color filters are provided respectively for G subpixels, R subpixels and B subpixels. Therefore, the halving can be implemented by making the transmittance of the color filter for each G subpixel equal to substantially half of the transmittance of the color filter for each R subpixel or the color filter for each B subpixel.

The halving may be implemented by making the area of the aperture part of each G subpixel equal to substantially half of the area of the aperture part of each R subpixel or the area of the aperture part of each B subpixel. For example, the length in the vertical direction (subpixel column direction) of each R subpixel or each B subpixel is made equal to substantially half of the length in the vertical direction of each G subpixel.

If the plane display unit 10*a* is a liquid crystal display device (liquid crystal display panel), the halving can be implemented by controlling voltage applied to liquid crystal in each of G subpixels, R subpixels, and B subpixels to make the intensity of light emitted from each G subpixel equal to substantially half of the intensity of light emitted from each R subpixel or each G subpixel.

If the plane display unit 10*a* is a liquid crystal display device (liquid crystal display panel), the halving can also be implemented by making the light quantity of each G subpixel concerning the back light equal to substantially half of the light quantity to each R subpixel or each B subpixel. For example, if the back light is a CCFL (Cold Cathode Fluorescent Lamp) or a white LED (Light Emitting Diode), the halving can be implemented by changing the composition of fluorescent substances in the CCFL or the white LED.

If the back light uses LEDs of three colors, i.e., red, blue and green, the halving can be implemented by making the number of green LEDs equal to substantially half of the number of red or blue LEDs. Since the luminous efficiency of the green LEDs is lower than that of the red or blue LEDs, the cost and power of the back light can be reduced.

If the plane display unit 10*a* is a spontaneous light display such as a plasma display device or an organic EL display device, the halving can be implemented by conducting driving to make the luminous intensity of each G subpixel equal to substantially half of the luminous intensity of each R subpixel or each B subpixel.

Incidentally, as a first modification of the present embodiment, a stereoscopic video display apparatus may have an arrangement in which G subpixels are interchanged with R subpixels.

Furthermore, as a second modification of the present embodiment, a stereoscopic video display apparatus may have an arrangement in which G subpixels are interchanged with B subpixels.

Incidentally, since G (green) becomes dominant on the luminance component as compared with R (red) or B (blue), the stereoscopic video display apparatus according to the present embodiment is more desirable than the first modification and the second modification.

Furthermore, as a third modification of the present embodiment, a stereoscopic video display apparatus may have an arrangement in which B subpixels are interchanged with R subpixels.

The embodiment is nothing but an example, and the scope of the invention is not restricted thereby.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and sprit of the inventions.

What is claimed is:

1. A stereoscopic video display apparatus comprising:
a plane display unit configured to include a display screen in which first to third subpixels having respectively different color components are arranged in a matrix form, each of the first to third subpixels, arranged consecutively, having a size in a row direction smaller than that in column direction each of the first to third subpixels having a size in a row direction smaller than that in column direction;
an optical plate configured to be disposed to be opposed to the plane display unit, the optical plate having a plurality of optical aperture parts, a direction of extension of the optical aperture parts being aligned with a column direction of subpixels on the display screen, light rays from the plane display unit being controlled by the optical plate; and
a drive unit configured to send data to the plane display unit, assign the data to the first to third subpixels in the plane display unit, and drive the plane display unit to display a stereoscopic video,
the plane display unit including a configuration obtained by arranging the first subpixels on a first subpixel row, arranging the third subpixels on a second subpixel row adjacent to the first subpixel row, arranging the second subpixels on a third subpixel row adjacent to the second subpixel row, arranging the third subpixels on a fourth subpixel row adjacent to the third subpixel row, and arranging a set of the first to fourth subpixel rows in the column direction of subpixels on the display screen repeatedly, wherein
the drive unit assigns an elemental image including a plurality of parallax images to each optical aperture part and assigns an elemental image display region in the plane display unit to each elemental image,
the drive unit assigns one subpixel column to each parallax image, and selects three subpixels which are the first to third subpixels arranged consecutively in the column direction of subpixels with the third subpixel located in the center, as a pixel displaying each parallax image, and
the drive unit performs driving to generate a signal value of a subpixel in one subpixel row shared by two adjacent rows in each frame when displaying each parallax image based on signal values of a color represented by the subpixel, of a plurality of pixels which display the parallax image in the two adjacent rows, at least one row located above the two adjacent rows, and at least one row located below the two adjacent rows.

2. The stereoscopic video display apparatus according to claim 1, wherein the plane display unit further includes a configuration obtained by providing a subpixel row formed of the first subpixels, a subpixel row formed of the third subpixels, and a subpixel row formed of the second subpixels in the cited order next to a final set in the repeatedly arranged sets.

3. The stereoscopic video display apparatus according to claim 1, wherein the signal value of the subpixel is equal to an average value of signal values of the color represented by the subpixel over the plurality of subpixels.

4. The stereoscopic video display apparatus according to claim 1, wherein intensity of light emitted from the third subpixel is less than an intensity of light emitted from the first subpixel or the second subpixel.

5. The stereoscopic video display apparatus according to claim 1, wherein the third subpixel is a G subpixel, and one of the first and second subpixels is an R subpixel whereas the other of the first and second subpixels is a B subpixel.

6. The stereoscopic video display apparatus according to claim 1, wherein the optical plate is a lenticular sheet.

7. The stereoscopic video display apparatus according to claim 1, wherein the optical plate is a slit.

8. A stereoscopic video display method for displaying a stereoscopic video by using a stereoscopic video display apparatus that comprise a plane display unit including a configuration obtained by arranging a first subpixels on a first subpixel row, arranging a third subpixels on a second subpixel row adjacent to the first subpixel row, arranging the second subpixels on a third subpixel row adjacent to the second subpixel row, arranging the third subpixels on a fourth subpixel row adjacent to the third subpixel row, and arranging a set of the first to fourth subpixel rows in the column direction of subpixels on a display screen repeatedly where the first to third subpixels have respectively different color components, and each of the first to third subpixels, arranged consecutively, having a size in a row direction smaller than that in column direction the method comprising:

assigning one subpixel column to each parallax image, and selecting three subpixels which are the first to third subpixels arranged consecutively in the column direction of subpixels with the third subpixel located in the center, as a pixel displaying each parallax image, and performing to generate a signal value of a subpixel in one subpixel row shared by two adjacent rows in each frame when displaying each parallax image based on signal values of a color represented by the subpixel, of a plurality of pixels which display the parallax image in the two adjacent rows, at least one row located above the two adjacent rows, and at least one row located below the two adjacent rows.

9. A stereoscopic video display apparatus comprising:

a display unit configured to include a display screen in which first to third subpixels having respectively different color components are arranged in a matrix form, each of the first to third subpixels, arranged consecutively, having a size in a row direction smaller than that in column direction each of the first to third subpixels having a size in a row direction smaller than that in column direction;

an optical plate configured to be disposed to be opposed to the display unit, the optical plate having a plurality of optical aperture parts, light rays from the display unit being controlled by the optical plate; and a drive unit configured to send data to the display unit, assign the data to the first to third subpixels in the display unit, and drive the display unit to display a stereoscopic video, the display unit including a configuration obtained by arranging the first subpixels on a first subpixel row, arranging the third subpixels on a second subpixel row adjacent to the first subpixel row, arranging the second subpixels on a third subpixel row adjacent to the second subpixel row, arranging the third subpixels on a fourth subpixel row adjacent to the third subpixel row, and arranging a set of the first to fourth subpixel rows in the column direction of subpixels on the display screen repeatedly, wherein the drive unit performs driving to generate a signal value of a subpixel in one subpixel row shared by two adjacent rows in each frame when displaying each parallax image based on signal values of a color represented by the subpixel, of a plurality of pixels which display the parallax image in the two adjacent rows, at least one row located above the two adjacent rows, and at least one row located below the two adjacent rows.

\* \* \* \* \*